No. 754,975. PATENTED MAR. 22, 1904.
D. M. DEARING.
MECHANICALLY PROPELLED VEHICLE.
APPLICATION FILED FEB. 19, 1903.
NO MODEL.
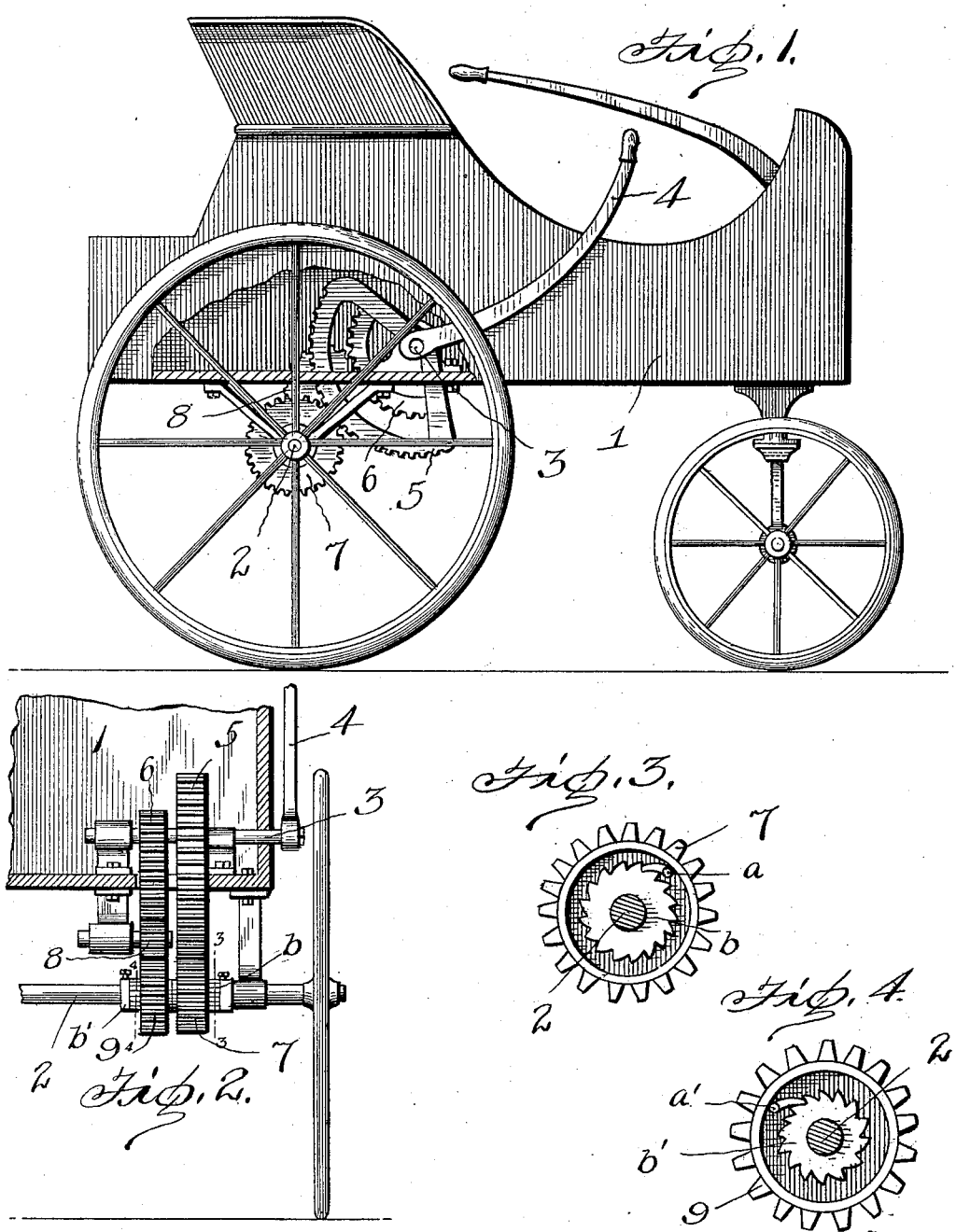
Witnesses
Jas. A. G. Koehl
[signature]
Inventor
D M. Dearing
By H. B. Willson
Attorney No. 754,975.

Patented March 22, 1904.

UNITED STATES PATENT OFFICE.

DAVID M. DEARING, OF JACKSON, MICHIGAN.

MECHANICALLY-PROPELLED VEHICLE.

SPECIFICATION forming part of Letters Patent No. 754,975, dated March 22, 1904.

Application filed February 19, 1903. Serial No. 144,115. (No model.)

*To all whom it may concern:*

Be it known that I, DAVID M. DEARING, a citizen of the United States, residing at Jackson, in the county of Jackson and State of Michigan, have invented certain new and useful Improvements in Mechanically-Propelled Vehicles; and I do declare the following to be a full, clear, and exact description of the invention, such as will enable others skilled in the art to which it appertains to make and use the same.

This invention relates to mechanically-propelled vehicles, and particularly to manual motors for children's vehicles; and its object is to provide simple and effective motor mechanism adapted to be operated by hand or foot power and to impart continuous forward motion when the operating element is rocked or vibrated back and forth.

With the seand other objects in view the invention consist, of certain novel features of construction, combination and arrangement of parts, as will be hereinafter more fully described, and particularly pointed out in the appended claims.

In the accompanying drawings, Figure 1 is a part sectional and part side elevational view of a vehicle embodying my invention. Fig. 2 is a cross-section showing the gearing in rear elevation, and Figs. 3 and 4 are vertical sections on the lines 3 3 and 4 4 of Fig. 2.

Referring now more particularly to the drawings, the numeral 1 represents the body of a vehicle, and 2 its rear driving shaft or axle. Mounted upon the body is a prime driving-shaft 3, actuated by a lever 4, adapted to be vibrated back and forth longitudinally of said body. Upon the shaft 3 are fixed two gear-segments 5 and 6 of different radii, the gears 5 meshing with a clutch-wheel 7, loosely mounted on the axle 2 and provided with a pawl *a* to engage a ratchet-wheel *b*, fixed to said axle. The gear-segment 6, on the other hand, meshes with an idler 8, which in turn meshes with a clutch-wheel 9, loosely mounted on the axle alongside the wheel 7 and provided with a pawl *a'* to engage a ratchet-wheel *b'*, fixed to said axle. The pawls *a a'* and teeth of the ratchet-wheels *b b'* are so disposed that the gears 7 and 9 are adapted to turn in a rearward direction loosely on the axle 2 and to be fixed to said axle to transmit motion thereto when they are turned or rotated in a forward direction.

In the operation of the gearing when the lever 4 is moved rearwardly the gear-segments 5 and 6 are moved downwardly and forwardly and the gear 5 transmits direct motion to the gear 7 to fix the latter to the axle 2 and turn said axle forwardly, while the gear-segment 6 rotates the idler 8 forwardly and the gear 9 rearwardly, the pawl *a'* of said gear 9 thus being caused to slip over the teeth of the ratchet-wheel *b'* and to turn loosely without communicating motion to the axle 2. When, on the other hand, the lever 4 is moved forwardly, the segment 5 on its upward movement will turn the gear 7 rearwardly and cause the same to turn loosely on the shaft 2, while reverse motion will be imparted by the segment 6 through the idler 8 to the gear 9 to turn said gear 9 forwardly, thus causing it to transmit continued forward motion to the shaft or axle 2.

It will thus be seen that in one direction of movement of the lever 4 one set of gears will transmit motion to the axle and that on the reverse movement of said handle the other set of gears will communicate motion to the axle in the same direction, the two sets of gears acting alternately, so as to impart continued action to the axle as the lever is vibrated back and forth.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. Propelling mechanism, comprising a rock-shaft, a driving element fixed thereto, a rotating shaft or axle, ratchet-wheels fixed thereto, gear-segments of different radii fixed to the rock-shaft and reciprocating simultaneously in an arcuate path, a gear-wheel loose on the rotating shaft and in direct mesh with the larger segment and provided with a vibratory pawl engaging one of said ratchet-wheels, an idler meshing with the smaller segment, and a second gear-wheel loose on the rotating shaft and meshing with said idler and provided with a vibratory pawl engaging the other ratchet-wheel, the teeth of the ratchet-wheels being so disposed as to impart continued forward motion to the rotary shaft upon the vibration of the said driving element and the reciprocation of said gear-segments, substantially as described.

2. Propelling mechanism comprising a rock-shaft, a driving element fixed thereto, a driven shaft having a rotary motion, and gearing between said shafts for imparting continuous rotary motion to the driven shaft upon the back-and-forth motion of the rock-shaft and driving element, said gearing including two reciprocatory gear elements fixed to the rock-shaft and two secondary or driven gears, said driven gears being directly mounted upon the driven shaft and reversely driven by the simultaneous reciprocation of the said gear elements, and a pawl-and-ratchet connection between each driven gear and the shaft to impart motion thereto when moved in one direction and to turn loosely thereon when moved in the opposite direction, substantially as described.

In testimony whereof I have hereunto set my hand in presence of two subscribing witnesses.

DAVID M. DEARING.

Witnesses:
M. L. PALMER,
KATE A. WILLIS.